United States Patent
Guim Bernat et al.

(10) Patent No.: US 11,743,143 B2
(45) Date of Patent: *Aug. 29, 2023

(54) SERVICE LEVEL AGREEMENT-BASED MULTI-HARDWARE ACCELERATED INFERENCE

(71) Applicant: Intel Corporation, Santa Clara, CA (US)

(72) Inventors: Francesc Guim Bernat, Barcelona (ES); Kshitij Arun Doshi, Tempe, AZ (US); Suraj Prabhakaran, Aachen (DE); Raghu Kondapalli, San Jose, CA (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,903

(22) Filed: Jun. 6, 2022

(65) Prior Publication Data

US 2022/0407784 A1     Dec. 22, 2022

Related U.S. Application Data

(63) Continuation of application No. 17/066,400, filed on Oct. 8, 2020, now Pat. No. 11,356,339, which is a
(Continued)

(51) Int. Cl.
*H04L 12/70*     (2013.01)
*H04L 41/0806*     (2022.01)
(Continued)

(52) U.S. Cl.
CPC ...... *H04L 41/5019* (2013.01); *H04L 41/0806* (2013.01); *H04L 41/5045* (2013.01);
(Continued)

(58) Field of Classification Search
CPC ............ H04L 41/5019; H04L 41/5045; H04L 41/0806; H04L 67/322; H04L 67/327;
(Continued)

(56) References Cited

U.S. PATENT DOCUMENTS 8,520,695 B1 *   8/2013   Rubin ............... G01C 21/3658
                                                              370/445
10,231,187 B1 *   3/2019   Rubin .................... H04W 4/46
(Continued)

FOREIGN PATENT DOCUMENTS

DE     112018006701     9/2020
WO      2019133180     7/2019

OTHER PUBLICATIONS

"International Application Serial No. PCT US2018 063354, International Search Report dated Mar. 12, 2019", 3 pgs.
(Continued)

*Primary Examiner* — Ario Etienne
*Assistant Examiner* — Elizabeth Kassa
(74) *Attorney, Agent, or Firm* — Schwegman Lundberg & Woessner, P.A.

(57) ABSTRACT

Various systems and methods for implementing a service-level agreement (SLA) apparatus receive a request from a requester via a network interface of the gateway, the request comprising an inference model identifier that identifies a handler of the request, and a response time indicator. The response time indicator relates to a time within which the request is to be handled indicates an undefined time within which the request is to be handled. The apparatus determines a network location of a handler that is a platform or an inference model to handle the request consistent with the response time indicator, and routes the request to the handler at the network location.

30 Claims, 6 Drawing Sheets

Related U.S. Application Data continuation of application No. 15/857,526, filed on Dec. 28, 2017, now Pat. No. 10,805,179.

(51) Int. Cl.

| | | |
|---|---|---|
| *H04W 48/08* | (2009.01) | |
| *H04L 67/12* | (2022.01) | |
| *H04L 41/5019* | (2022.01) | |
| *H04L 41/5041* | (2022.01) | |
| *H04L 67/61* | (2022.01) | |
| *H04L 67/63* | (2022.01) | |
| *G06N 5/04* | (2023.01) | |

(52) U.S. Cl.
CPC ............. *H04L 67/12* (2013.01); *H04L 67/61* (2022.05); *H04L 67/63* (2022.05); *G06N 5/04* (2013.01)

(58) Field of Classification Search
CPC ......... H04L 67/12; H04L 67/61; H04L 67/63; G06N 5/04
USPC ....................................................... 709/223
See application file for complete search history.

(56) References Cited

U.S. PATENT DOCUMENTS

| | | | |
|---|---|---|---|
| 10,805,179 B2 | 10/2020 | Guim Bernat et al. | |
| 11,356,339 B2 | 6/2022 | Guim Bernat et al. | |
| 2013/0212277 A1 | 8/2013 | Bodik et al. | |
| 2013/0278440 A1* | 10/2013 | Rubin ................ | G01C 21/3658 340/903 |
| 2013/0281141 A1* | 10/2013 | Rubin .................... | H04W 4/06 455/500 |
| 2013/0293394 A1* | 11/2013 | Rubin ................... | G08G 1/166 340/902 |
| 2015/0142950 A1 | 5/2015 | Anderson et al. | |
| 2015/0215173 A1 | 7/2015 | Dutta et al. | |
| 2016/0021017 A1* | 1/2016 | Thubert ................ | H04L 47/125 370/235 |
| 2016/0112341 A1 | 4/2016 | Lui et al. | |
| 2016/0306661 A1 | 10/2016 | Di Balsamo et al. | |
| 2017/0195459 A1* | 7/2017 | e Costa .................. | H04L 67/34 |
| 2019/0044831 A1 | 2/2019 | Guim Bernat et al. | |
| 2019/0095491 A1* | 3/2019 | Bhattacharjee ..... | G06F 16/2433 |
| 2021/0099362 A1 | 4/2021 | Guim Bernat et al. | |

OTHER PUBLICATIONS

"International Application Serial No. PCT US2018 063354, Written Opinion dated Mar. 12, 2019", 7 pgs.

"U.S. Appl. No. 15/857,526, Non Final Office Action dated Nov. 15, 2019", 21 pgs.

"U.S. Appl. No. 15/857,526, Response filed Feb. 17, 2020 to Non Final Office Action dated Nov. 15, 2019", 12 pgs.

"U.S. Appl. No. 15/857,526, Notice of Allowance dated Jun. 10, 2020", 16 pgs.

"International Application Serial No. PCT US2018 063354, International Preliminary Report on Patentability dated Jul. 9, 2020", 9 pgs.

"U.S. Appl. No. 17/066,400, Preliminary Amendment filed Apr. 1, 2021", 7 pgs.

"U.S. Appl. No. 17/066,400, Non Final Office Action dated Oct. 28, 2021", 12 pgs.

"U.S. Appl. No. 17/066,400, Response filed Jan. 12, 2022 to Non Final Office Action dated Oct. 28, 2021", 8 pgs.

"U.S. Appl. No. 17/066,400, Notice of Allowance dated Feb. 7, 2022", 7 pgs.

U.S. Appl. No. 15/857,526 U.S. Pat. No. 10,805,179, filed Dec. 28, 2017, Service Level Agreement-Based Multi-Hardware Accelerated Inference.

U.S. Appl. No. 17/066,400 U.S. Pat. No. 11,356,339, filed Oct. 8, 2020, Service Level Agreement-Based Multi-Hardware Accelerated Inference.

* cited by examiner

SERVICE LEVEL AGREEMENT-BASED MULTI-HARDWARE ACCELERATED INFERENCE

PRIORITY APPLICATION

This application is a continuation of U.S. application Ser. No. 17/066,400, filed Oct. 8, 2020, now issued as U.S. Pat. No. 11,356,339, which is a continuation of U.S. application Ser. No. 15/857,526, filed Dec. 28, 2017, now issued as U.S. Pat. No. 10,805,179, all of which are incorporated herein by reference in their entirety.

TECHNICAL FIELD

Embodiments described herein generally relate to processing techniques used with data communications and interconnected device networks, and in particular, to techniques applied within internet of things (IoT) devices and device networks.

BACKGROUND

IoT devices are physical objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

Acronyms

The following acronyms may be used herein:

| | |
|---|---|
| 3GPP | Third Generation Partnership Project |
| 5G | Fifth Generation |
| AAA | authentication, authorization, and accounting |
| ADC | analog-to-digital |
| AI | artificial intelligence |
| AMD | Advanced Micro Devices |
| ARM | advanced RISC machines |
| ASIC | application specific integrated circuit |
| BATMAN | better approach to mobile ad-hoc networking |
| BLE | Bluetooth low-energy |
| CAN | Controller Area Network |
| CD-ROM | compact disc read-only memory |
| CoAP | Constrained Application Protocol |
| CPU | central processing unit |
| DDP | dual die package |
| DDR | double data rate (memory/standard) |
| DIMM | dual in-line memory module |
| DVD-ROM | digital versatile disk-read-only memory |
| EDGE | Enhanced Data Rates for GSM Evolution |
| EISA | extended industry standard architecture |
| EEPROM | electrically erasable programmable read-only memory |
| EPROM | electrically programmable read-only memory |
| ETSI | European Telecommunications Standards Institute |
| FPGA | field-programmable gate array |
| GHz | gigahertz |
| GPRS | General Packet Radio Service |
| GPS | global positioning system |
| GSM | Global System for Mobile Communications |
| HDD | hard disk drive |
| HTTP | hyper-text transfer protocol |
| IEEE | Institute of Electrical and Electronics Engineers |
| IETF | Internet Engineering Task Force |
| IoT | Internet-of-things |
| ID | identifier |
| IO (I/O) | input-output |
| IP | Internet protocol |
| ISA | industry standard architecture |
| ITU | International Telecommunication Union |
| JEDEC | Joint Electron Devices Engineering Council |
| LAN | local area network |
| LCD | liquid crystal display |
| LED | light-emitting diode |
| LIN | Local Interconnect Network |
| LPDDR | low power double data rate (memory/standard) |
| LPWA | low-power wide area |
| LPWAN | Low Power Wide-Area Networks |
| LTE | Long-Term Evolution (standard) |
| LTE-A | Long-Term Evolution - Advanced (standard) |
| LWM2M | lightweight machine-to-machine |
| M2M | machine-to-machine |
| MCU | microcontroller unit |
| MUX | multiplexing |
| NIC | network interface controller |
| OCF | Open Connectivity Foundation |
| OLSR | optimized link state |
| OMA | Open Mobile Alliance |
| OMAP | Open Multimedia Applications Platform |
| PC | personal computer |
| PCI | peripheral component interconnect |
| PCIe | peripheral component interconnect express |
| PCIx | peripheral component interconnect extended |
| PDA | personal digital assistant |
| PROFIBUS | Process Field Bus |
| PROFINET | Process Field Net |
| RAM | random access memory |
| RISC | reduced instruction set computer |
| RDT | Resource Director Technology |
| QDP | quad die package |
| QoS | quality of service |
| SD | Secure Digital |
| SDP | single die package |
| SLA | service level agreement |
| SoC | system on a chip |
| SoCH | state of charge |
| SoF | state of function |
| SoH | state of health |
| SSDD | solid state disk drive |
| TCO | total cost of ownership |
| UMTS | Universal Mobile Telecommunications System |
| USB | universal serial bus |
| VLSI | very-large-scale integration |
| VM | virtual machine |
| WAN | wide area network |
| xD | extreme digital |

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
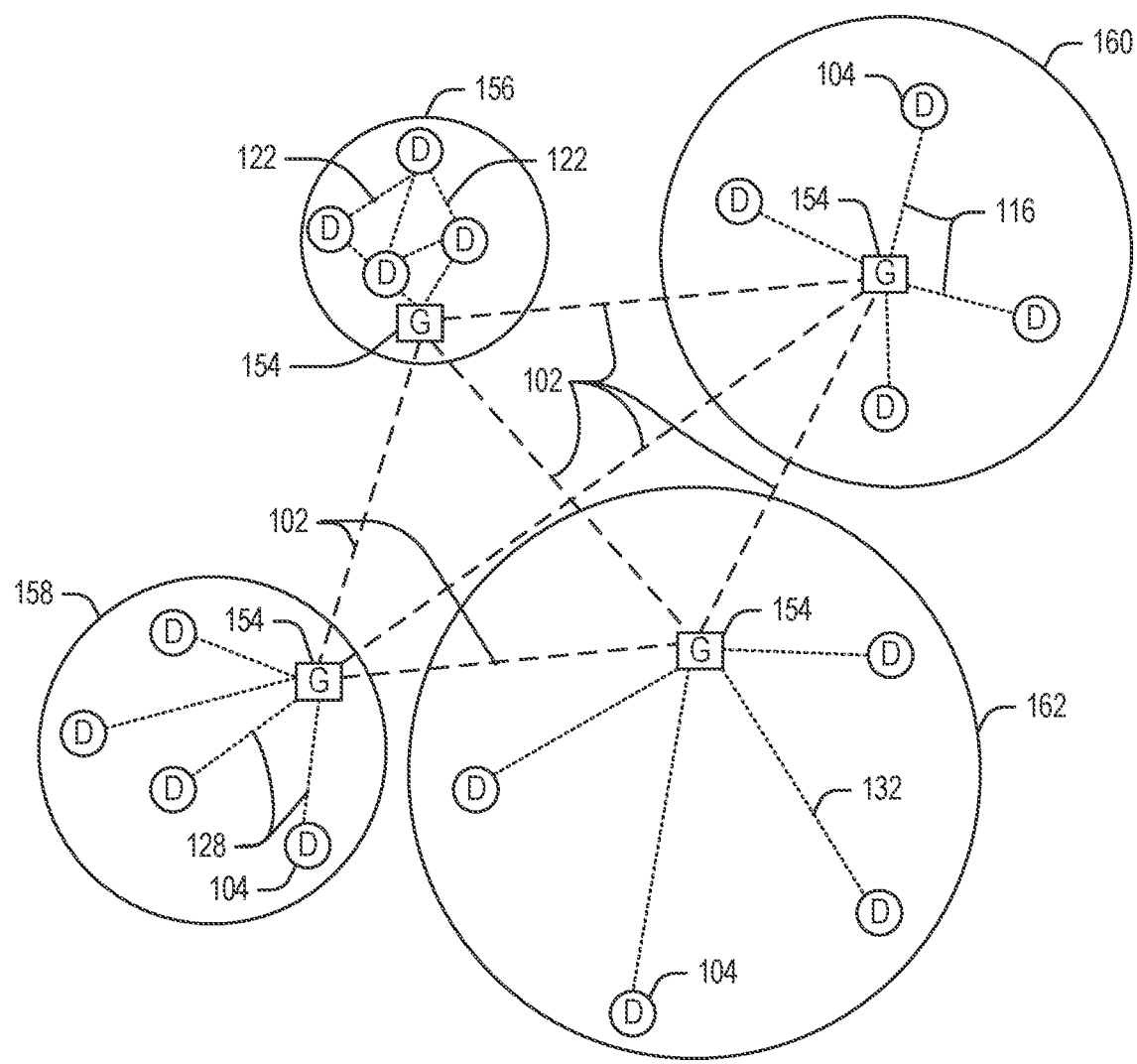
FIG. 1 illustrates a domain topology for respective internet-of-things (IoT) networks coupled through links to respective gateways, according to an example.

In the following description, methods, configurations, and related apparatuses are disclosed for the processing of security contexts in an IoT device interconnection setting through the use of a service level agreement-based multi-hardware accelerated inference system.

A rapid growth in applications of deep learning indicates a likely scenario that in edge cloud and IoT environments, many devices will be requesting inferences from the edge cloud. These devices each will have very different performance requirements, and that these devices may be in an ad-hoc relationship with the edge cloud service providers. For example, a car that is about to leave an area of coverage in the next fraction of a second may need an inference (handling of a request) within a few hundred milliseconds. Another car requesting a much simpler inference from the same edge cloud may tolerate a response time of a second or two. Even the same inference (e.g., traffic prediction) may be implemented with different levels of performance/power/cost in different parts of the same edge cloud: (a) one may use a small FPGA and give one level of latency; another may use a 2× bigger FPGA and produce answers/responses with 66% of the latency of the first one; (b) different platforms in the same edge cloud may use resources with differing capabilities—from relatively low power, low performance processing power to high power, high performance processing power. Thus it may be difficult to direct the available resources in edge clouds for AI acceleration to suitable platforms and devices while benefitting from the cost effective sharing of these resources among many requestors and unpredictable request arrival rates.

Software entities (such as VMs, containers, etc.) may be programmed to use dedicated acceleration resources. Such an approach selects the requests and maps or steers them to particular machines' or containers' associated hardware acceleration devices—and in the process, such a design would likely use some central resource manager to parse and decide what needs to be done for each request and what platform or VM should handle it. However, this approach may add a significant amount of software overhead in parsing (the SLA needs), selecting, routing/steering, etc. The overhead are not just in the software based computations, but also in the protocol processing and the costs of layers of software that are involved in communications. Given that inferences in deep learning are already latency sensitive, and that different situations (at different requestors) require different objectives to be met, costs rise and risks of missing the needed SLAs rise as well, when many requests arrive unpredictably. Enabling this takes coordination between different daemons of a software running in a distributed fashion, causing a high overhead. This also leads to high TCO as computing instances are devoted to such SLA agreements.

One could potentially use RDT to mitigate some of the QoS challenges in orchestration. But that alone solves very little, as software and protocol processing overheads can easily swamp the tight latency budgets, especially in 5G applications on the edge. Thus, hardware mechanisms are beneficial to distribute requests based on edge cloud client requirements and priorities, so that quick distribution to the right acceleration point can be accomplished.

Hardware based capabilities may thus be provided in the edge cloud that process inference requests from clients/requesters, where the requests arrive with an SLA or deadline requirements (and possibly cost constraints and other information as well). The requirements may be met by directing them to the right AI inference appliance or inference model that can best meet the constraints. If none of the inference appliance/models can satisfy the requirement and cost, a similar resource may be selected that satisfies a soft requirement. However, if only hard requirements are specified and they cannot be satisfied, then such requests are rejected explicitly instead of risking silent errors. If the client provides more information (i.e., what slack it can tolerate) then the logic proposed herein can choose the most efficient methods—e.g., a method that is least costly in dollars or in time, and still meets the SLA.

The techniques discussed herein include the use of a gateway that may maintain information about the available platforms and associated inference models capable of responding to a request from a requester within a requested deadline, and possibly determining the deadline when one is not provided by the requester. The inference models themselves may be implemented in a hardware-based field-programmable gate array, or some other accelerator type of platform that is capable of rapidly handling requests from the various requesters.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
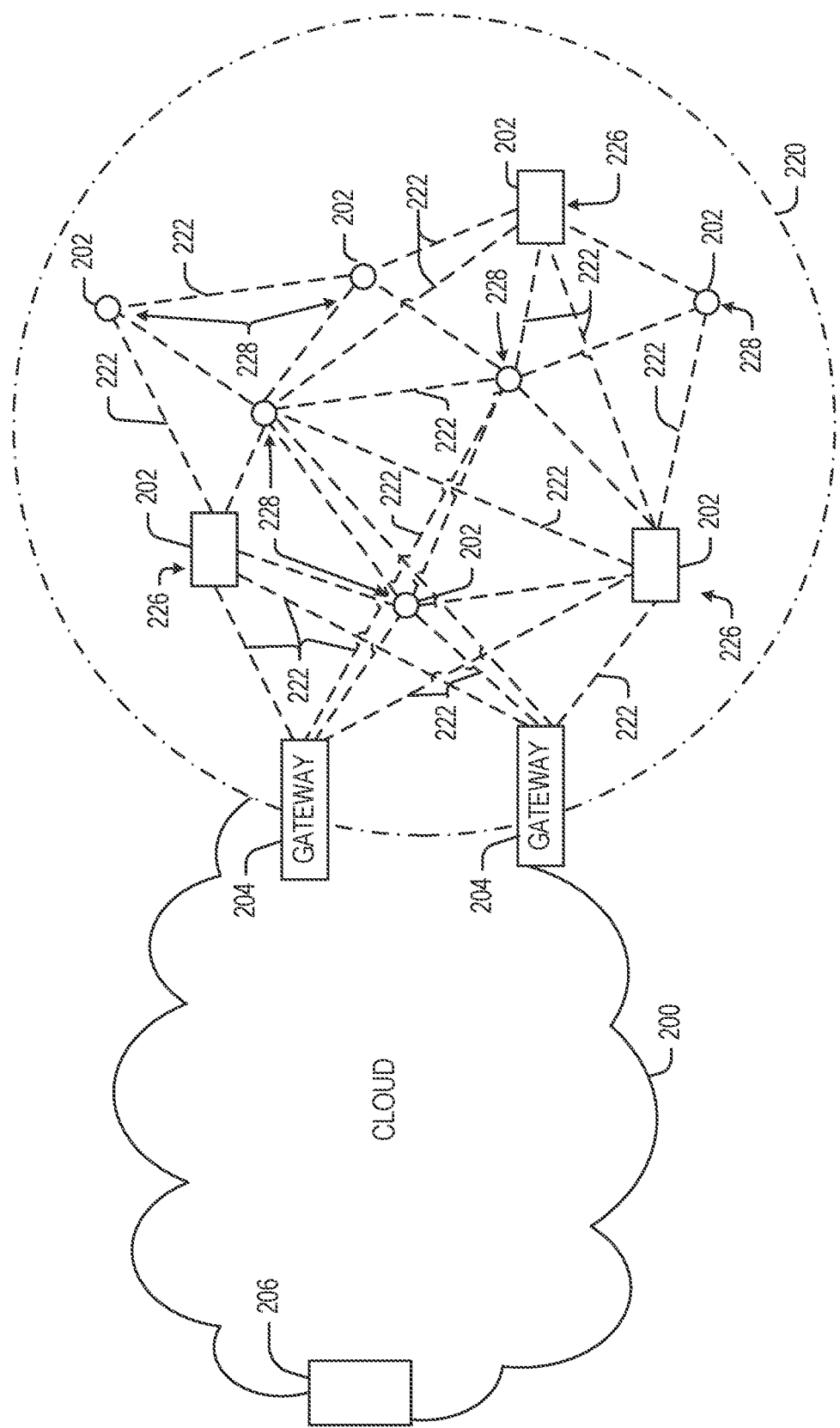
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 5 and 6.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (BATMAN) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back-end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above with reference to FIGS. 3 and 4 may be embodied by a IoT device machine in the example form of an electronic processing system, within which a set or sequence of instructions may be executed to cause the electronic processing system to perform any one of the methodologies discussed herein, according to an example implementation. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

The edge clients send inference requests to the edge network platform (e.g., a platform that is implemented at or near the edge devices, as part of a fog or edge-based topology). In the examples discussed herein, the edge network platform may provide interfaces, applications, or services in the manner of a cloud or similar network-distributed platform, through the use of coordinated edge device functionality through an AI training and inference switch and gateway. It allows each client to specify a Model ID and an optional requirement such as deadline, performance or cost. The gateway contains components that decide which inference model on which assets reachable from the gateway are to be used to satisfy each such request. In turn, each platform in the cloud is equipped with elements that provide necessary information to the gateway for it to make the best-informed decision.

Figure 3:
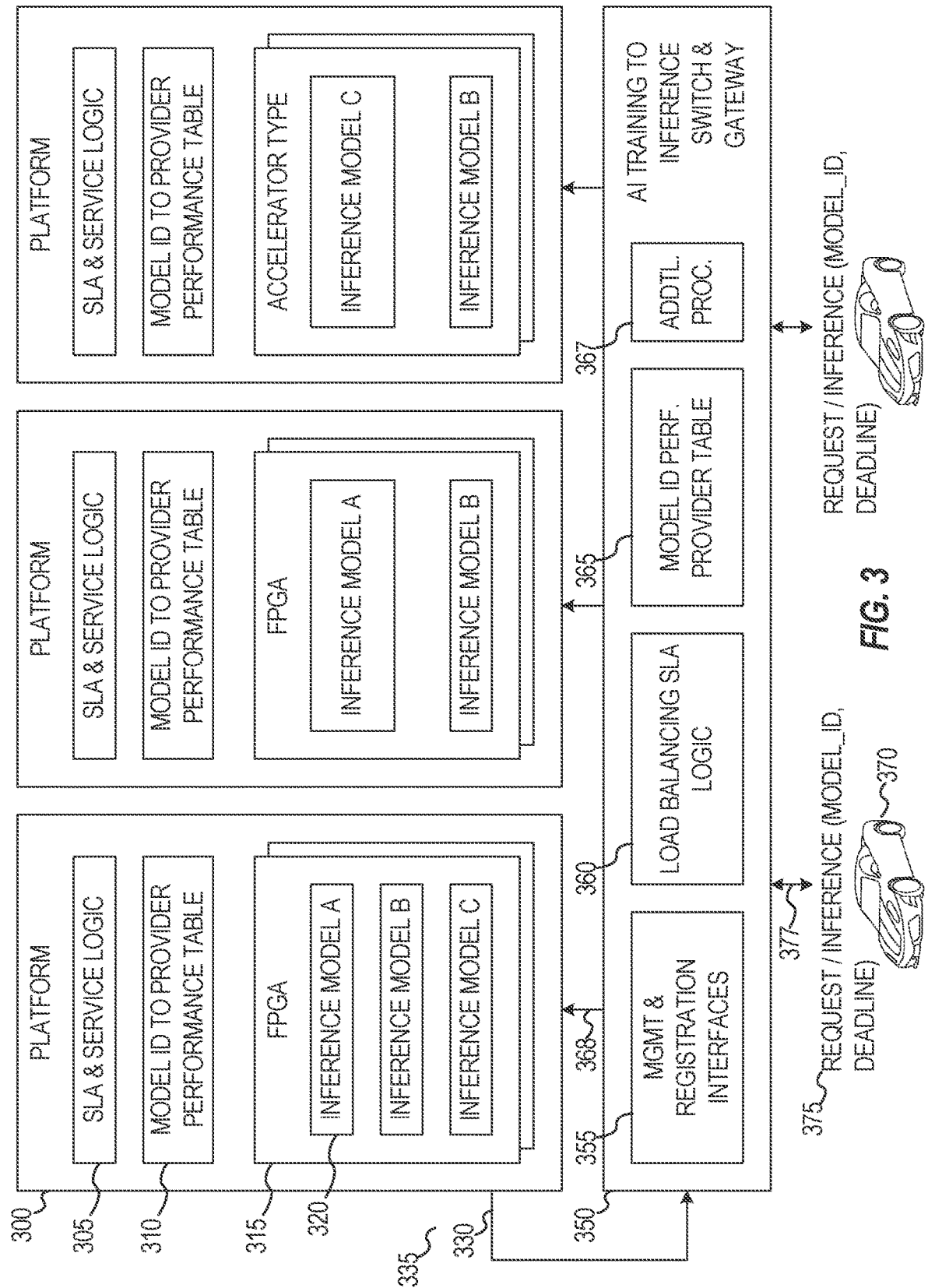
FIG. 3 illustrates a block diagram of an implementation of the service level agreement-based multi-hardware accelerated inference.

FIG. 3 is a block diagram that illustrates one example implementation of an architecture used for the system. An acceleration platform 300 may comprise extensions that include a SLA and service logic element 305 enables service discovery and SLA discovery of models available within the acceleration platforms 300. Using this capability, a solution provider can set or modify the catalogue of available models within each platform. This may be achieved, for example, by using a management and registration interfaces component 355, discussed below. In this example, an AI training to interface switch and gateway 350 may send an incoming inference request, in accordance with the availability of various models, to be received by the SLA and service logic element 305 via a network interface 368.

The platform 300 may also comprise a model ID-to-provider performance table (or map) 310, which may provide model ID details (that is, the functions or capabilities available) from each acceleration asset in the platform 300. This table or map 310 may be internal to the platform 300, encapsulated behind the SLA-and-service logic element 305.

The individual implementations of various inference models 320 may be implemented as various model types (e.g., accelerator type) 315, such as fixed function models, FPGA models, or implemented in some other way.

The architecture may further comprise the AI training and inferencing switch and gateway 350 noted above, which may be a dedicated hardware appliance or implemented as software running on a general-purpose computer, possibly in conjunction with certain accelerated hardware. The gateway 350 may include management and registration interfaces 355 that may implement a set of interfaces that edge cloud solution providers and managers may use to set, modify, or remove the SLAs that are in the SLA-and-service logic component 305 of each platform 300. The management and registration interfaces 355 may also be used to register new models, modify existing models, or move models to different resources in different platforms as needs grow or decline.

The AI training and inferencing switch and gateway 350 may also comprise load balancing and SLA logic 360, which provides a capability in the gateway for distributing an incoming inference request 375 from a requester 370 over a gateway-requester link 377 to a particular platform 300 (where it may be mapped to a particular platform asset). The SLA part of this logic may examine and select the best resources (platforms 300 and inference models 320) in the system that can satisfy a given request 375 and its implicit or explicit service quality objectives (e.g., "must process a scene in 100 microseconds"). The load balancing part 360 of this logic may identify the best way to reduce various costs and overhead within the overall SLA constraints. The gateway 350 may also translate or modify original SLA parameters of the request 375. For instance, original request SLA may be "do this request within 100 µs", but the gateway 350 knows about the processing chain of three functions to satisfy this request, so the gateway 350 may provide the SLA to the first inference model 320 "do the first function within 10 µs", to the second inference model "do the second function within 50 µs", and to the third function "do the third function within 20 µs", thus making sure that resulting SLA still satisfied.

The load balancing SLA logic 360 may perform traditional load balancing among platforms 300 and inference models 320, but it may also take into account the priorities of the requests 375 themselves. Additionally, the load balancing may remember where a previous request 375 has been processed, or its relation to other requests or events that are to be processed at the same time. For example, the vehicle 370 may be receiving information from both an infrared camera and a proximity sensor—both of them may be providing critical data (e.g., the infrared camera indicates that the object is a person, and the proximity sensor indicates that the object is within 3 feet of the front of the vehicle 370). The requests 375 from these two devices are to be processed quickly in a coordinated manner e.g., by passing them to the same processing element (platform 300, accelerator/FPGA 315, inference model 320). The gateway 350 may also initiate parallel (as opposed to sequential) processing of two independent processing engines (inference models 320 or platforms 300) to speed up the results. In some cases, the request requires extra processing resources (for example, after processing radar information, there may be no need to process camera information because of very clear result), but the gateway 350 could weigh the priority and consider the benefit, according to some defined criteria, between extra processing cost and required SLA.

The load balancing SLA logic 360 may also know of the available processing capacity of the platforms 300 to take into account when routing the requests 375. Furthermore, when the gateway 350 itself is in danger of receiving too many requests, the load balancing SLA logic 360 may aggregate similar requests together and send them as a single aggregated request to an appropriate platform 300 or inference model 320. For example, if fire sensors are deployed in a park, and a huge wildfire is present, there may be a large amount of very high priority requests 375 being received by the gateway 350. Rather than attempting to route each request indicating the fire status to the particular inference model 320, the inference model 320 may be designed to handle an aggregated request 320 in such an instance and respond to it in a timely manner.

For this resource selection process, the SLA logic may use a local model-ID to performance provider table 365 to identify the right resources. This table 365 may maintain a list of model IDs for the various inference models 320 available in the system and their performance characteristics in the various implementations in the different platforms 300. The table 365 may be updated whenever a service level of a model ID in a platform resource is modified. Thus, changes may occur in the performance of different providers as their implementations (especially, inferencing models 320) get updated or when their physical resource configurations change, or when new policies get defined that cause resource availabilities (I/O bandwidths, power, etc.) to be affected.

The model-ID to performance provider table 365 may be implemented as a lookup table and identify who provides the models, some information about those models, and how requests 375 are to be processed. The look-up table implementation may provide a rapid access and mapping to the appropriate platform 300 and inference model 320, and the table may be updated/synchronized via the network. It would also be possible for the gateway 350 to query the platforms 300 to determine what inference models 320 are being run—however, this involves additional communications overhead. Such requests could happen, for example, when the gateway 350 is recovering from a failure/information loss.

The registration interface 355 may be used as a control or management plane, such as when a new element starts up or some configuration, function, availability, or other parameters change. In normal operation, this may not be very frequent event. While in a large system the scalability of such events could be significant, the access will generally not be as frequent as access to the lookup table, which may be accessed for every request. The lookup table may thus include the information required to process the request (meaning, for example, to perform the load balancing decision in the best possible way). Some information from registration process may be populated into the lookup table, but not all: the information can be aggregated, compressed or optimized in some other way. This, however, does not mean that registration may be processed slower. For example, when the vehicle approaches the intersection and registers with gateway 350 located there, there may be a need to process the registration quickly to enable further requests from the vehicle to be processed.

The deadline may be provided by the requester 370 (or gateway) 350 as either a hard deadline or a soft deadline. With the hard deadline, failure to locate an inference model that can meet the requested deadline may result in the request being dropped and this status being reported back to the requester. With a soft deadline, failure to locate an inference model that can meet the requested deadline may result in the request being directed to a next-best-available inference model. A deadline parameter range may be utilized in which the shorter deadline is a soft deadline, and a longer deadline is a hard deadline.

As noted above, the deadline may also incorporate cost information, and thus, as defined herein, the deadline may incorporate not only timing criteria, but cost criteria as well. Thus, the gateway 350 may be able to take the cost information into account (e.g., seek the least costly solution within certain time parameters). For example, a gateway 350 rule may be, "Find the model that satisfies the timing requirements of the SLA. If multiple options are available, sort them by the cost. For the same cost, prefer lower SLA out of all satisfactory SLAs. If the cost and SLA is the same for multiple options, choose one randomly."

The platform 300, accelerator element 315, or inference model 320 may provide some form of communication response to the request 375, such as control, status, or other type of information. The response may be sent via a platform-gateway link 330 (which may then subsequently be conveyed to the requester 370 via the gateway-requester link 377) or via a platform-requester link 335. Although the platform-gateway link 330 and platform-requester link 335 are shown as uni-directional links, they can also be bi-directional links which permit the platforms 300, accelerators 315, or inference models 320 to communicate directly with the gateway 350 or the requester 370, provided the proper information (e.g., identifiers, communication parameters, etc.) are provided to permit such communications to take place.

In the following, a use case is described in which the system is applied to an autonomous car application in which one or more autonomous cars are operating. The vehicles or components of the vehicles are the requesters 370 mentioned above. Each of the vehicles 370 may send out their own information in the form of requests 375. Some of the requests 375 contain information that is more critical than others. Less critical requests 375 may relate to, for example, tire pressure or fuel efficiency, and thus do not need to be reported or acted on immediately (although, as discussed below, the urgency of a request could differ depending on a value related to the request). In contrast, some of the requests 375 are related to more critical criteria that need to be reported immediately and acted on immediately. A more critical request 375, for example, may be one with information about another car crossing the intersection or a light change at an intersection. The criticality deals primarily with processing priority, and latency. A light change is something we would need to handle quickly. As used herein, the term "request" may be broadly construed as not only a request for information or activity, but may also be construed to simply supplying information that may be of use to another entity.

Given that there may be many requests 375 generated throughout the system, the gateway 350 may identify and classify, for one or more vehicles (370, or more generally, the requester) associated with the gateway 350, a received request 375. The gateway 350 may be associated with the requester 370 using known network association techniques, similar to those of a cell phone being associated with a given base station. The association may primarily dynamic, as in the case with a vehicle changing its location frequently, or primarily static, as in the case with an appliance in a user's home—an appropriate known technique may be utilized in each situation.

In the present use case, the vehicle 370 approaches an intersection. A gateway 350 is present in the intersection and acts as a gateway between vehicles 370 (and other objects near the intersection as potential requesters) and the inference models 320 that might be able to service them. The vehicle 370 and the gateway 350 communicate with one another to establish a connection that may be used to communicate intersection-related requests 375. The gateway 350 has been loaded with the management and registration interfaces 355, which may be in the form of a table or other database, that it is aware of and that permits a request 375 to be directed to the proper inference model 320. These registration interfaces 355 may be preloaded into the gateway or may be updated dynamically based on a network connection to another location, such as a base station or centralized management location. Changes (additional, modifications, deletions) to the available inference models 320 or platforms 300 may be communicated to the known gateways 350 (which may be, e.g., registered in a known centralized location). It is also possible for such management and registration interfaces to be updated by mobile vehicles that are in the proximity of the gateway through, for example, a wireless interface.

In a first example of the use case, the vehicle 370 approaches the intersection and a vision system recognizes the light at the intersection as being red. Since the vehicle is some distance from the light and the intersection, giving ample time to respond, this is considered to be a non-critical, low priority, high latency event. A communications element on the vehicle 370, sends the request 375 to the gateway 350 indicating that it is to be handled by a traffic-light-handling inference model 320 located on the platform and handled with a low-priority/high latency (e.g., 2 sec.) handling. The request 375 may also contain other relevant data besides a model ID of the inference model 320 that should handle the request and the deadline (also referred to herein as a response time indicator that relates to a required response time), priority, or latency of the request 375—the request may contain identifying information about the requester 370 (in the present example, this may be, for example, a vehicle identification number or state plate number) and any relevant parameters describing the requester 370, its status, or information that may be useful to the inference model 320.

The gateway 350 receives the request 375 indicating that it is to be handled by the traffic-light-handling-inference model 320 and that it is a low-priority request 375. The gateway 350 receives the low-priority request 320 and looks to its model-ID to performance provider table 365 to determine that the low priority request may be sent to a specific traffic-light-handling inference model 320 located in a specific platform 300 in a distant centralized location. The traffic light handling inference model 320 may then determine braking parameters necessary to decelerate the vehicle 370 to a stop before reaching the intersection and communicate the braking parameters back to the vehicle 370 via one of the platform-requester link 335 or the platform-gateway/gateway-requester 330/377 links. This example is a very simplistic illustration, and presumes that the necessary distance/location of the vehicle 370 is communicated and that there are no other vehicles ahead of the requesting vehicle 370. If additional vehicles are present, information about them is communicated to the inference model 320 as well.

Following through with this example, while the vehicle 370 is stopped before the intersection at the red light, an object passes in front of the vehicle 370. At least one of an infrared sensor, proximity detector, vision recognition system, or other sensor may determine that the object is a person. The information about the detected person is sent in a request 375 to the gateway for an object-in-vehicle-path inference model 320. Since the vehicle 370 is stopped at the intersection for the red light, logic that may be present in the vehicle 370 may determine that this is a low-priority, high-latency request. The gateway 350 may transfer this request to an object-in-vehicle-path inference model 320 located in a platform 300 in a distant centralized location. In one implementation, the logic to determine the priority of the request may not be present in the vehicle 370, but rather may be present in additional processing logic 367 of the gateway.

This example may be contrasted with a situation in which the vehicle 370 is approaching the intersection at the speed limit since the light is green and the relevant inference model 320 indicates continuing through the intersection at the speed limit. However, now the sensors, as before, determine that a person is in the intersection. The information about the detected person is sent in a request 375 to the gateway. However, since the car is moving at the speed limit towards the intersection, the logic that may be present either in the vehicle 370 or additional processing logic 367 in the gateway 350 may determine that this is a high-priority, low-latency request. The gateway 350 may transfer this request to an object-in-vehicle-path inference model 320 located in a platform 300 nearby, such as one located near the intersection. This nearby inference model 320 may quickly determine, using information about the vehicle speed, distance between the vehicle 370 and the person, person's velocity, and other vehicles at or approaching the intersection to determine whether the vehicle 370 needs to hard brake, swerve around the person, or take some other action to prevent an accident. Once the needed action is determined by the inference model 320, the necessary information (braking, steering, or other parameters) may be sent to the vehicle 370 for execution.

The above example illustrates that a same type of inference model 320 (in the example, the object-in-vehicle-path inference model) may be present in both a nearby high-response, low-latency platform 300 and in a distant low-response, high-latency platform 300, depending on the circumstances, values, and logic associated with the request information.

Another example illustrating this may be a request associated with a temperature sensor of the vehicle 370. If the temperature sensor reads 85° F., the request 375 may be sent to the gateway with a temperature inference model ID and a low-priority deadline, since the temperature is consistent with a summer day temperature reading. However, if the temperature sensor reads 500° F., the request may be sent to the gateway with a temperature inference model ID and a high-priority deadline, since the temperature is consistent with the car being on fire. In the former case, the gateway 350 locates a low-priority inference model to handle the request, and in the latter case, the gateway 350 locates a high-priority inference model to handle the request.

In another example, the vehicle 370 on a two-lane road may desire to pass another vehicle. The decision for an appropriate time to pass may be made by a passing inference model 320. In this example, the sensors in the vehicle 370 may determine whether it can legally pass by, e.g., looking at lane markings. If the lane markings indicate a legal passing, then the sensors look to see if there is an oncoming car in the other lane at a distance that makes it safe to do the passing. The passing request 375 thus has a model ID that triggers activation of a passing inference model 320 on a particular platform 300 (e.g., a car passing platform) that runs the calculations, and determines whether the vehicle 370 may pass the other car or not. In other words, the request 375 by the vehicle may utilize the model ID to invoke that particular platform 300 (car passing platform) and inference model 320 (car passing inference model). In this example, the gateway 350 may be located on the vehicle itself. In such a case, there may be a hierarchy of interconnected gateways 350 in which the gateway 350 in the vehicle may handle higher priority requests, and external gateways in the hierarchy may handle lower-priority requests.

In another example, even though the sensor detects that the vehicle 370 does not have a legal ability for passing (e.g., a double line is present), but the road is blocked by a delivery truck. Based on the request 375, the inference model 320 may indicate, taking the available information into account, that the vehicle 370 should pass in violation of the law, rather than potentially waiting hours for the delivery truck to move. The inference models 320 may also suggest breaking the law (e.g., speed limit) if a passenger's health is in danger.

In general, then, the gateway 350 may identify the request 375, classify the request 375, and then determine the processing element (platform 300) for that request 375, that is, which platform 300 has an available inference model 320 that can process that request 375 with the right priority. In the event that there is simply no platform 300 with an inference model 320 to timely handle the request 375, an affirmative communication may be provided by the gateway 350 (or other entity) to the requester 370 so that the requester 370 can know of the failure (as opposed to simply dropping the request 375).

In the event that a high-priority request 375 is received by the gateway 350 and no current platforms 300 have an inference model 320 available to handle the request 375, it is possible that the handling of a lower-priority request 375 can be dropped or delayed on the platform by the service logic 305 in order to timely service the high-priority request 375. Similarly, in routing the request 375 by the gateway 350 via the load balancing SLA logic 360, a lower-priority request 375 may be held back or discarded (with notice to the requester 370) when a high-priority request 375 is received and the available platforms 300 and inference models 320 to handle the request 375 are limited.

In general, for time critical applications, the platforms 300 may be located near the requester 370, e.g., at the intersections in the example above. These could be small edge computer platforms located on poles of the intersection or in the road itself. For less time critical applications, the platforms 300 may be located further away, such as at a central office. The requester 370 itself could have a first level of processing in it, for example, to determine whether a request 375 is to be sent as a low- or high-priority request. If the requester 370 cannot determine the priority, it may send the request 375 with an "unknown" for the priority (in which case the priority may be determined by the additional processing logic 367 in the gateway 350), or it may automatically send the request 375 as a high priority request. The priority may depend on the type of device sending it, some value, or some other criteria. It is beneficial if the platforms 300 have reserve capacity in order to handle surges in requests from many requesters 370 at one time. As mentioned above, multiple gateways 350 could be connected together in a hierarchical manner, with those gateways 350 lower in the hierarchy being more responsive and capable of dealing with high-priority requests, and those gateways 350 higher in the hierarchy being less responsive and capable of dealing with low-priority (but potentially more complex) requests.

The model ID used in the request 375 may be a description of the type of request or data packet that requires handling. It is an identifier of the data type that is being communicated, and also the nature of the desired service (of the inference model 320). The model ID is thus related to the specific model to run, taking sensor detections, definitions, and logic into account.

In order to assign the relationships between the model ID and the platform 300 and inference models 320, in one implementation, a manufacturer of a sensor, for example, may provide processing software or hardware for processing the sensor information as the inference models 320. In one implementation, software modules may be deployed by the manufacturer or third party. The deployment mechanism could be performed, for example, in the cloud, and could be operable in any type of environment and utilize any type of orchestration environment to deploy those modules. Some of the inference models 320 may be deployed based on the type of processing, and could be deployed in an edge computer, an edge data center, base station, central data center, or any other location having computing resources—dependent on the inference model 320 itself.

In the vehicle example discussed above, the temperature sensor inference model 320 may be deployed both nearby in an edge computer (close to the base station), as well as in the cloud (at some distance). To that end, an orchestration system may utilize a deployment template in order to conform to a deployment scenario. The deployment scenario in this example thus implements the temperature sensor inference model in both places because the temperature sensor could produce requests with both high priority and low priority data or low latency high latency processing requirement. For every sensor or every model ID, there may be provided a deployment scenario where those model IDs are deployed, i.e., the orchestration system may be based on the inference model 320 for a model ID being deployed at particular locations.

In an implementation, a number of gateways 350 could be communicatively networked to each other in the form of, for example, a mesh so that they can share information. A first gateway 350 may be aware of a platform's 300 capability of handling certain types of requests that a second gateway 350 does not know about. If the two gateways 350 can communicate with each other, and the first gateway 350 receives a very high priority request 375 and cannot locate resources (platform 300 or inference model 320) to handle the request 375, it may communicate with the second gateway 350 to find additional low latency processing capability that can handle the request 375. Thus, the first gateway 350 can pass the request to the second gateway 350 and the second gateway 350 can route the request to the appropriate platform 300 or inference model 320. Or, in another implementation, the second gateway 350 can simply pass on information to the first gateway 350 that permits the first gateway to route the request to the appropriate platform 300 or inference model 320. This interconnection of gateways 350 could also be utilized to create a hierarchy of gateways 350, as described above.

Figure 4:
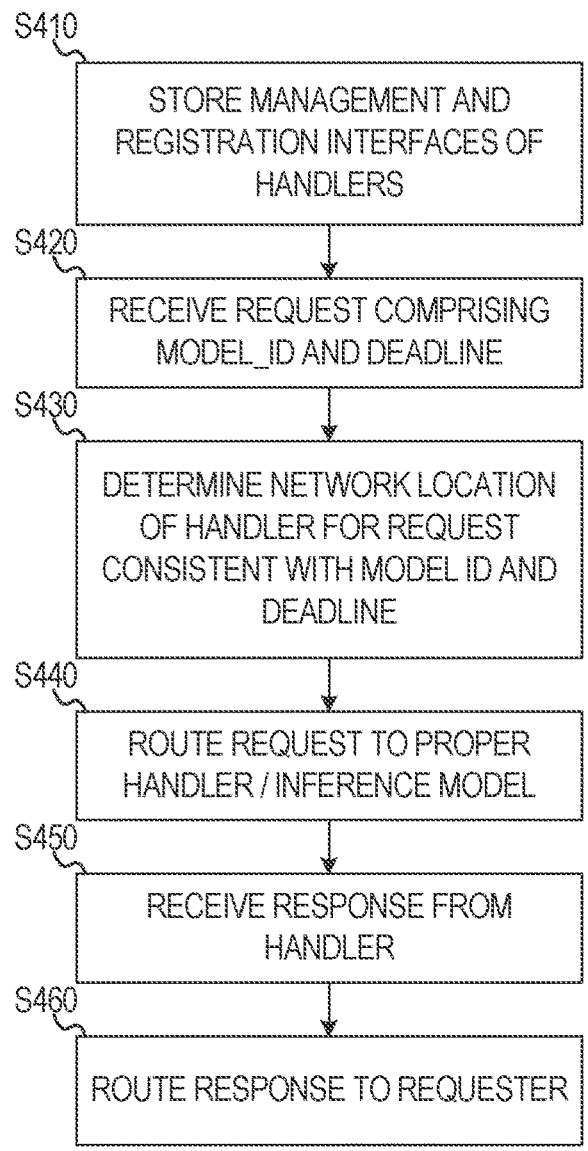
FIG. 4 illustrates a flowchart of an implementation of a process flow for the service level agreement-based multi-hardware accelerated inference.

FIG. 4 illustrates a flowchart of an implementation of an example process 400 for operating the gateway 350. In operation S410, the gateway 350 stores the management and registration interfaces 355 in a memory of the gateway 350. As described above, these registration interfaces 355 may be preloaded into the gateway or may be updated dynamically based on a network connection to another location, such as a base station or centralized management location. Changes (additional, modifications, deletions) to the available inference models 320 or platforms 300 may be communicated to the known gateways 350 (which may be, e.g., registered in a known centralized location). It is also possible for such management and registration interfaces to be updated by mobile vehicles that are in the proximity of the gateway through, for example, a wireless interface.

In operation S420, the gateway 350 receives a request 375 from a requester 370 that contains the model ID and a deadline that is a time indication of when the request 375 is to be handled by an inference model 320. The request 375 may be received from a sensor or a processor of the requester via, for example, a network connection between the gateway 350 and the requester.

In operation S430, the gateway 350 accesses information about the availability of platforms 300 and their available inference models 320 that are capable of handling the request 375 within the deadline provided with the request. If the requester 370 has not provided the deadline information, e.g., by sending a value representing "unknown" to the gateway 350, then the gateway itself may implement additional processing logic 367 to determine the appropriate deadline to associate with the request. If a suitable platform 300 and inference model 320 cannot be located to meet the required deadline, then the requester 370 may be informed of this problem so that the requester 370 knows that the request 375 will not be handled.

In operation S440, once a suitable platform 300 and inference model 320 has been located, the request 375 may be routed to the platform/inference model for handling. As noted above, high priority/low latency (short deadline) requests will typically be routed to nearby platforms 300 via responsive network communications, whereas low priority/high latency (long deadline) requests may be routed to more distant or centralized platforms 300 in order to preserve more responsive inference model resources for more time critical requests 375.

In operation S450, the gateway 350 may receive a response to the request from the inference model 320. By way of the example discussed above, such a response may be braking or steering parameters for the autonomous vehicle (requester) 370 when an object is detected in the vehicle's path. In other embodiments, the inference model may send the response directly to the requester 370. Information stored in the request 375 may be used for getting the response to the requester 370, whether indirectly via the gateway 350 or directly (which may be faster).

In operation S460, when the gateway 350 serves to indirectly provide the response received from the inference model 320, it locates the network address of the requester 370 based on information that is either contained within response itself or that is maintained in a memory of the gateway 350 and related to the request 375. Data may be maintained in the gateway 350 in the event that the requester 370 has been handed off to another gateway 350 so that the response is delivered to the requester using the new gateway 350. In one implementation, the requester 370 may be associated with multiple gateways at the same time.

Figure 5:
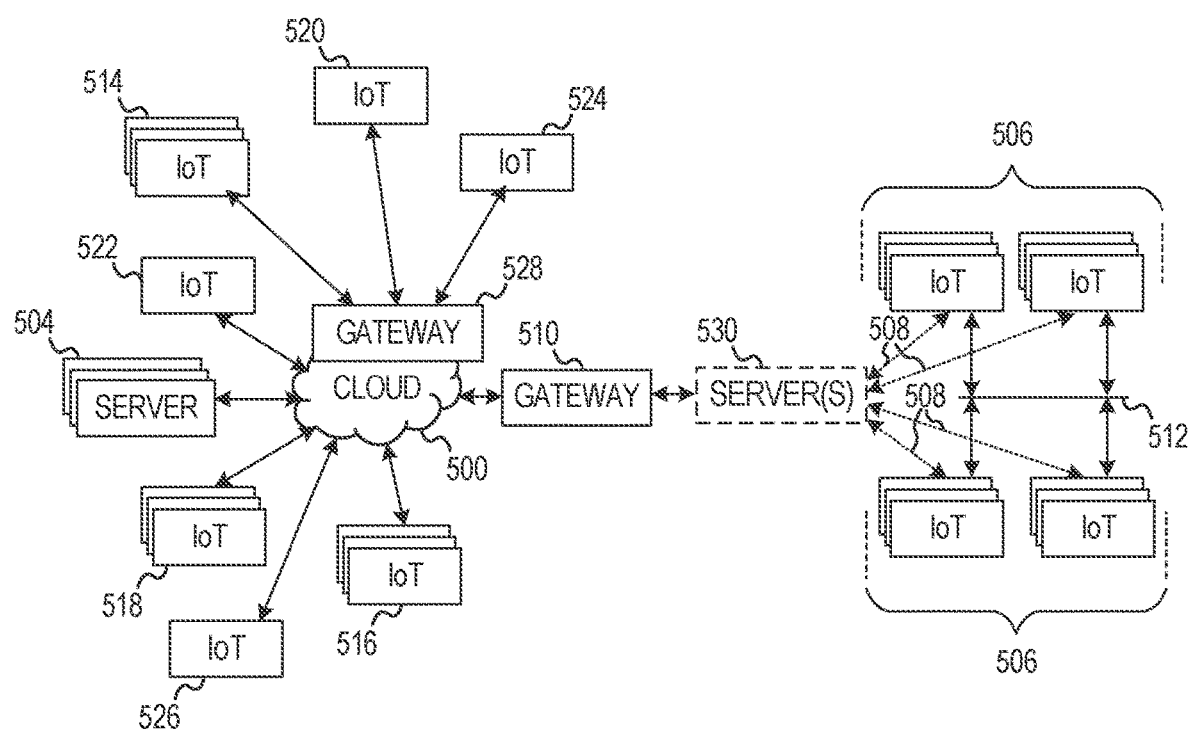
FIG. 5 illustrates a block diagram of a network illustrating communications among a number of IoT devices, according to an example.

FIG. 5 illustrates a drawing of a cloud computing network, or cloud 500, in communication with a number of Internet of Things (IoT) devices. The cloud 500 may represent the Internet, or may be a local area network (LAN), or a wide area network (WAN), such as a proprietary network for a company. The IoT devices may include any number of different types of devices, grouped in various combinations. For example, a traffic control group 506 may include IoT devices along streets in a city. These IoT devices may include stoplights, traffic flow monitors, cameras, weather sensors, and the like. The traffic control group 506, or other subgroups, may be in communication with the cloud 500 through wired or wireless links 508, such as LPWA links, optical links, and the like. Further, a wired or wireless sub-network 512 may allow the IoT devices to communicate with each other, such as through a local area network, a wireless local area network, and the like. The IoT devices may use another device, such as a gateway 510 or 528 to communicate with remote locations such as the cloud 500; the IoT devices may also use one or more servers 530 to facilitate communication with the cloud 500 or with the gateway 510. For example, the one or more servers 530 may operate as an intermediate network node to support a local edge cloud or fog implementation among a local area network. Further, the gateway 528 that is depicted may operate in a cloud-to-gateway-to-many edge devices configuration, such as with the various IoT devices 514, 520, 524 being constrained or dynamic to an assignment and use of resources in the cloud 500.

Other example groups of IoT devices may include remote weather stations 514, local information terminals 516, alarm systems 518, automated teller machines 520, alarm panels 522, or moving vehicles, such as emergency vehicles 524 or other vehicles 526, among many others. Each of these IoT devices may be in communication with other IoT devices, with servers 504, with another IoT fog device or system (not shown, but depicted in FIG. 2), or a combination therein. The groups of IoT devices may be deployed in various residential, commercial, and industrial settings (including in both private or public environments).

As can be seen from FIG. 5, a large number of IoT devices may be communicating through the cloud 500. This may allow different IoT devices to request or provide information to other devices autonomously. For example, a group of IoT devices (e.g., the traffic control group 506) may request a current weather forecast from a group of remote weather stations 514, which may provide the forecast without human intervention. Further, an emergency vehicle 524 may be alerted by an automated teller machine 520 that a burglary is in progress. As the emergency vehicle 524 proceeds towards the automated teller machine 520, it may access the traffic control group 506 to request clearance to the location, for example, by lights turning red to block cross traffic at an intersection in sufficient time for the emergency vehicle 524 to have unimpeded access to the intersection.

Clusters of IoT devices, such as the remote weather stations 514 or the traffic control group 506, may be equipped to communicate with other IoT devices as well as with the cloud 500. This may allow the IoT devices to form an ad-hoc network between the devices, allowing them to function as a single device, which may be termed a fog device or system (e.g., as described above with reference to FIG. 2).

Figure 6:
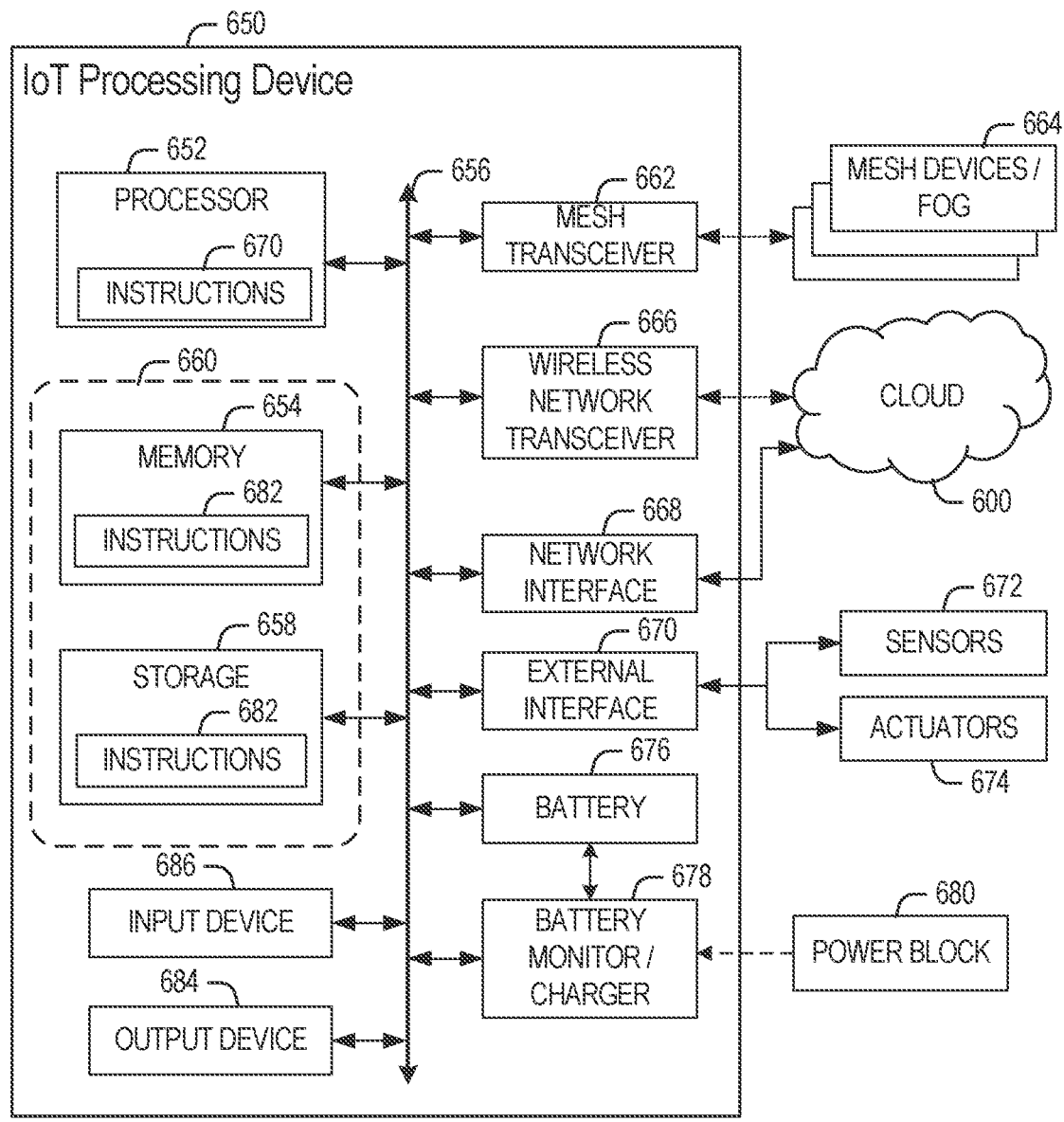
FIG. 6 illustrates a block diagram for an example IoT processing system architecture upon which any one or more of the techniques (e.g., operations, processes, methods, and methodologies) discussed herein may be performed, according to an example.

FIG. 6 is a block diagram of an example of components that may be present in an IoT device 650 for implementing the techniques described herein. The IoT device 650 may include any combinations of the components shown in the example or referenced in the disclosure above. The components may be implemented as ICs, portions thereof, discrete electronic devices, or other modules, logic, hardware, software, firmware, or a combination thereof adapted in the IoT device 650, or as components otherwise incorporated within a chassis of a larger system. Additionally, the block diagram of FIG. 6 is intended to depict a high-level view of components of the IoT device 650. However, some of the components shown may be omitted, additional components may be present, and different arrangement of the components shown may occur in other implementations.

The IoT device 650 may include a processor 652, which may be a microprocessor, a multi-core processor, a multi-threaded processor, an ultra-low voltage processor, an embedded processor, or other known processing element. The processor 652 may be a part of a system on a chip (SoC) in which the processor 652 and other components are formed into a single integrated circuit, or a single package, such as the Edison™ or Galileo™ SoC boards from Intel. As an example, the processor 652 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (QDP). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example the storage 658 may be implemented via a solid state disk drive (SSDD). Other devices that may be used for the storage 658 include flash memory cards, such as SD cards, microSD cards, xD picture cards, and the like, and USB flash drives. In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in a SoC based system. Other bus systems may be included, such as an I2C interface, an SPI interface, point to point interfaces, and a power bus, among others.

The interconnect 656 may couple the processor 652 to a mesh transceiver 662, for communications with other mesh devices 664. The mesh transceiver 662 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 664. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 662 may communicate using multiple standards or radios for communications at different range. For example, the IoT device 650 may communicate with close devices, e.g., within about 10 meters, using a local transceiver based on BLE, or another low power radio, to save power. More distant mesh devices 664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 666 may be included to communicate with devices or services in the cloud 600 via local or wide area network protocols. The wireless network transceiver 666 may be a LPWA transceiver that follows the IEEE 802.15.4, or IEEE 802.15.4g standards, among others. The IoT device 650 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 662 and wireless network transceiver 666, as described herein. For example, the radio transceivers 662 and 666 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 662 and 666 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 666, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 668 may be included to provide a wired communication to the cloud 600 or to other devices, such as the mesh devices 664. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to allow connect to a second network, for example, a NIC 668 providing communications to the cloud over Ethernet, and a second NIC 668 providing communications to other devices over another type of network.

The interconnect 656 may couple the processor 652 to an external interface 670 that is used to connect external devices or subsystems. The external devices may include sensors 672, such as accelerometers, level sensors, flow sensors, optical light sensors, camera sensors, temperature sensors, a global positioning system (GPS) sensors, pressure sensors, barometric pressure sensors, and the like. The external interface 670 further may be used to connect the IoT device 650 to actuators 674, such as power switches, valve actuators, an audible sound generator, a visual warning device, and the like.

In some optional examples, various input/output (I/O) devices may be present within, or connected to, the IoT device 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 650.

A battery 676 may power the IoT device 650, although in examples in which the IoT device 650 is mounted in a fixed location, it may have a power supply coupled to an electrical grid. The battery 676 may be a lithium ion battery, or a metal-air battery, such as a zinc-air battery, an aluminum-air battery, a lithium-air battery, and the like.

A battery monitor/charger 678 may be included in the IoT device 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 678 may communicate the information on the battery 676 to the processor 652 over the interconnect 656. The battery monitor/charger 678 may also include an analog-to-digital (ADC) convertor that allows the processor 652 to directly monitor the voltage of the battery 676 or the current flow from the battery 676. The battery parameters may be used to determine actions that the IoT device 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the IoT device 650. A wireless battery charging circuit, such as an LTC4020 chip from Linear Technologies of Milpitas, Calif., among others, may be included in the battery monitor/charger 678. The specific charging circuits chosen depend on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine readable medium 660 including code to direct the processor 652 to perform electronic operations in the IoT device 650. The processor 652 may access the non-transitory, machine readable medium 660 over the interconnect 656. For instance, the non-transitory, machine readable medium 660 may be embodied by devices described for the storage described above, or may include specific storage units such as optical disks, flash drives, or any number of other hardware devices. The non-transitory, machine readable medium 660 may include instructions to direct the processor 652 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a service-level agreement (SLA) gateway apparatus comprising: memory; and processing circuitry coupled to the memory, the processing circuitry to: receive a request from a requester via a network interface of the gateway, the request comprising: an inference model identifier that identifies a handler of the request; and a response time indicator that: relates to a time within which the request is to be handled; or indicates an undefined time within which the request is to be handled; determine a network location of a handler that is a platform or an inference model to handle the request consistent with the response time indicator; and route the request to the handler at the network location.

In Example 2, the subject matter of Example 1 includes, wherein when the response time indicator indicates the undefined time, the processing circuitry is to further: determine the response time indicator, based on at least one of the inference model identifier or additional data of the request.

In Example 3, the subject matter of Examples 1-2 includes, wherein the processing circuitry is to further: store management and registration interfaces comprising network locations of handlers in the memory that are used in the determining of the network location.

In Example 4, the subject matter of Examples 1-3 includes, wherein the processing circuitry is to further: receive, from the platform or inference model, a response to the request.

In Example 5, the subject matter of Example 4 includes, wherein the processing circuitry is to further: forward the response to the requester.

In Example 6, the subject matter of Examples 1-5 includes, wherein the processing circuitry is to further: assess a plurality of capable handlers capable of handling the request within a time indicated by the response time indicator; and perform the determination of the network location based on a least one of an availability of the capable handlers or previous routings of requests.

In Example 7, the subject matter of Examples 1-6 includes, wherein the processing circuitry is to further: aggregate a plurality of requests into an aggregated request; and route the aggregated request to a network location of an aggregated request handler that is an aggregated request platform or an aggregated request inference model.

In Example 8, the subject matter of Examples 1-7 includes, wherein the processing circuitry is to further: associating the gateway with the requester; and establishing a communication link between the gateway and the requester when the requester meets a predefined linking criteria.

In Example 9, the subject matter of Examples 1-8 includes, wherein the processing circuitry is to further: delay or drop a prior request having a higher response time indicator than the received request.

In Example 10, the subject matter of Example 9 includes, wherein the processing circuitry is to further: send an indication to the requester of the dropped or delayed request that its request has been dropped or delayed.

In Example 11, the subject matter of Examples 1-10 includes, wherein the processing circuitry is to further: establish a communication link between the gateway and a second gateway, wherein the gateway receives the network location from the second gateway.

In Example 12, the subject matter of Examples 1-11 includes, wherein the determination of the network location of the handler is based on a physical distance of the handler or network speed to the handler and the response time indicator.

Example 13 is a method for operating a service-level agreement (SLA) gateway, the gateway comprising a processor, and the method comprising using the processor to perform operations of: receiving a request from a requester via a network interface of the gateway, the request comprising: an inference model identifier that identifies a handler of the request; and a response time indicator that: relates to a time within which the request is to be handled; or indicates an undefined time within which the request is to be handled; determining a network location of a handler that is a platform or an inference model to handle the request consistent with the response time indicator; and routing the request to the handler at the network location.

In Example 14, the subject matter of Example 13 includes, wherein when the response time indicator indicates the undefined time, the method further comprises: determining the response time indicator, based on at least one of the inference model identifier or additional data of the request.

In Example 15, the subject matter of Examples 13-14 includes, wherein method further comprises: storing management and registration interfaces comprising network locations of handlers in a memory of the gateway that are used in the determining of the network location.

In Example 16, the subject matter of Examples 13-15 includes, receiving, from the platform or inference model, a response to the request.

In Example 17, the subject matter of Example 16 includes, forwarding the response to the requester.

In Example 18, the subject matter of Examples 13-17 includes, accessing a plurality of capable handlers capable of handling the request within a time indicated by the response time indicator; and performing the determining of the network location based on a least one of an availability of the capable handlers or previous routings of requests.

In Example 19, the subject matter of Examples 13-18 includes, aggregating a plurality of requests into an aggregated request; and routing the aggregated request to a network location of an aggregated request handler that is an aggregated request platform or an aggregated request inference model.

In Example 20, the subject matter of Examples 13-19 includes, associating the gateway with the requester; and establishing a communication link between the gateway and the requester when the requester meets a predefined linking criteria.

In Example 21, the subject matter of Examples 13-20 includes, delaying or dropping a request having a higher response time indicator than the received request.

In Example 22, the subject matter of Example 21 includes, sending an indication to the requester of the dropped or delayed request that its request has been dropped or delayed.

In Example 23, the subject matter of Examples 13-22 includes, establishing a communication link between the gateway and a second gateway, wherein the gateway receives the network location from the second gateway.

In Example 24, the subject matter of Examples 13-23 includes, wherein the determining of the network location of the handler is based on a physical distance of the handler or network speed to the handler and the response time indicator.

Example 25 is a method for operating a service-level agreement (SLA) system, the system comprising a gateway and a platform connected via a network, the method comprising: using a processor of the gateway to perform operations of: receiving a request from a requester via a network interface of the gateway, the request comprising: an inference model identifier that identifies a handler of the request; and a response time indicator that: relates to a time within which the request is to be handled; or indicates an undefined time within which the request is to be handled; determining a network location of a handler that is a platform or an inference model to handle the request consistent with the response time indicator; and routing the request to the handler at the network location; and using a processor of the platform to perform operations of: receiving the request from the gateway; and executing activities by the inference model identified by the inference model identifier utilizing information provided in the request within a time indicated by the response time indicator.

In Example 26, the subject matter of Example 25 includes, the method further comprising: using the processor of the platform: sending response information related to the request to at least one of the gateway or the requester.

In Example 27, the subject matter of Examples 25-26 includes, wherein the inference models are implemented in a field-programmable gate array on the platform.

Example 28 is a computer program product comprising one or more computer readable storage media comprising computer-executable instructions operable to, when executed by processing circuitry of a service-level agreement (SLA) gateway apparatus, cause the apparatus to: receive a request from a requester via a network interface of the gateway, the request comprising: an inference model identifier that identifies a handler of the request; and a response time indicator that: relates to a time within which the request is to be handled; or indicates an undefined time within which the request is to be handled; determine a network location of a handler that is a platform or an inference model to handle the request consistent with the response time indicator; and route the request to the handler at the network location.

In Example 29, the subject matter of Example 28 includes, wherein when the response time indicator indicates the undefined time, the processing circuitry is to further: determine the response time indicator, based on at least one of the inference model identifier or additional data of the request.

In Example 30, the subject matter of Examples 28-29 includes, wherein the processing circuitry is to further: store management and registration interfaces comprising network locations of handlers in the memory that are used in the determining of the network location.

In Example 31, the subject matter of Examples 28-30 includes, wherein the processing circuitry is to further: receive, from the platform or inference model, a response to the request.

In Example 32, the subject matter of Example 31 includes, wherein the processing circuitry is to further: forward the response to the requester.

In Example 33, the subject matter of Examples 28-32 includes, wherein the processing circuitry is to further: assess a plurality of capable handlers capable of handling the request within a time indicated by the response time indicator; and perform the determination of the network location based on a least one of an availability of the capable handlers or previous routings of requests.

In Example 34, the subject matter of Examples 28-33 includes, wherein the processing circuitry is to further: aggregate a plurality of requests into an aggregated request; and route the aggregated request to a network location of an aggregated request handler that is an aggregated request platform or an aggregated request inference model.

In Example 35, the subject matter of Examples 28-34 includes, wherein the processing circuitry is to further: associating the gateway with the requester; and establishing a communication link between the gateway and the requester when the requester meets a predefined linking criteria.

In Example 36, the subject matter of Examples 28-35 includes, wherein the processing circuitry is to further: delay or drop a prior request having a higher response time indicator than the received request.

In Example 37, the subject matter of Example 36 includes, wherein the processing circuitry is to further: send an indication to the requester of the dropped or delayed request that its request has been dropped or delayed.

In Example 38, the subject matter of Examples 28-37 includes, wherein the processing circuitry is to further: establish a communication link between the gateway and a second gateway, wherein the gateway receives the network location from the second gateway.

In Example 39, the subject matter of Examples 28-38 includes, wherein the determination of the network location of the handler is based on a physical distance of the handler or network speed to the handler and the response time indicator.

Example 40 is a service-level agreement (SLA) gateway apparatus comprising: means for receiving a request from a requester via a network interface of the gateway, the request comprising: an inference model identifier that identifies a handler of the request; and a response time indicator that: relates to a time within which the request is to be handled; or indicates an undefined time within which the request is to be handled; means for determining a network location of a handler that is a platform or an inference model to handle the request consistent with the response time indicator; and means for routing the request to the handler at the network location.

In Example 41, the subject matter of Example 40 includes, wherein when the response time indicator indicates the undefined time, the apparatus further comprises: means for determining the response time indicator, based on at least one of the inference model identifier or additional data of the request.

In Example 42, the subject matter of Examples 40-41 includes, wherein apparatus further comprises: means for storing management and registration interfaces comprising network locations of handlers in a memory of the gateway that are used in the determining of the network location.

In Example 43, the subject matter of Examples 40-42 includes, means for receiving, from the platform or inference model, a response to the request.

In Example 44, the subject matter of Example 43 includes, means for forwarding the response to the requester.

In Example 45, the subject matter of Examples 40-44 includes, means for accessing a plurality of capable handlers capable of handling the request within a time indicated by the response time indicator; and means for performing the determining of the network location based on a least one of an availability of the capable handlers or previous routings of requests.

In Example 46, the subject matter of Examples 40-45 includes, means for aggregating a plurality of requests into an aggregated request; and means for routing the aggregated request to a network location of an aggregated request handler that is an aggregated request platform or an aggregated request inference model.

In Example 47, the subject matter of Examples 40-46 includes, means for associating the gateway with the requester; and means for establishing a communication link between the gateway and the requester when the requester meets a predefined linking criteria.

In Example 48, the subject matter of Examples 40-47 includes, means for delaying or dropping a request having a higher response time indicator than the received request.

In Example 49, the subject matter of Example 48 includes, means for sending an indication to the requester of the dropped or delayed request that its request has been dropped or delayed.

In Example 50, the subject matter of Examples 40-49 includes, means for establishing a communication link between the gateway and a second gateway, wherein the gateway receives the network location from the second gateway.

In Example 51, the subject matter of Examples 40-50 includes, wherein the determining of the network location of the handler is based on a physical distance of the handler or network speed to the handler and the response time indicator.

Example 52 is a service-level agreement (SLA) system comprising: a gateway; and a platform connected via a network; the gateway comprising: means for receiving a request from a requester via a network interface of the gateway, the request comprising: an inference model identifier that identifies a handler of the request; and a response time indicator that: relates to a time within which the request is to be handled; or indicates an undefined time within which the request is to be handled; means for determining a network location of a handler that is a platform or an inference model to handle the request consistent with the response time indicator; and means for routing the request to the handler at the network location; and the platform comprising: means for receiving the request from the gateway; and means for executing activities by the inference model identified by the inference model identifier utilizing information provided in the request within a time indicated by the response time indicator.

In Example 53, the subject matter of Example 52 includes, the platform further comprising: means for sending response information related to the request to at least one of the gateway or the requester.

In Example 54, the subject matter of Examples 52-53 includes, wherein the inference models are implemented in a field-programmable gate array on the platform.

Example 55 is a computer program product comprising one or more computer readable storage media comprising computer-executable instructions operable to, when executed by processing circuitry of a device, cause the device to perform any of the methods of Examples 13-27.

Example 56 is a system comprising means to perform any of the methods of Examples 13-27.

Example 57 is a system to perform any of the operations of Examples 1-54.

Example 58 is a method to perform any of the operations of Examples 1-54.

Example 59 is at least one machine-readable medium including instructions that, when executed by processing circuitry, cause the processing circuitry to perform operations to implement of any of Examples 1-54.

Example 60 is an apparatus comprising means to implement of any of Examples 1-54.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A gateway comprising:
   memory; and
   processing circuitry coupled to the memory, the processing circuitry to:
   receive a request from a requester via a network interface of the gateway, the request including: an inference model identifier that identifies a registered platform of the request and a response time indicator;
   transmit the request to the registered platform to handle the request consistent with the response time indicator, the registered platform selected based on a latency of the registered platform and the response time indicator; and
   delay a different request having a higher response time indicator than the received request.

2. The gateway of claim 1, wherein when the response time indicator indicates an undefined time, the processing circuitry is to determine the response time indicator, based on the inference model identifier.

3. The gateway of claim 1, wherein the processing circuitry is to:
   store management and registration interfaces including a network location of each of a plurality of platforms that are used in the selection of the registered platform.

4. The gateway of claim 1, wherein the different request is received prior to the request from the requester.

5. The gateway of claim 1, wherein the processing circuitry is to:
   assess a plurality of platforms capable of handling the request within a time indicated by the response time indicator; and
   determine a network location based on at least one of: an availability of the plurality of platforms or previous routings of requests.

6. The gateway of claim 1, wherein the processing circuitry is to:
   aggregate a plurality of requests into an aggregated request; and
   route the aggregated request to a platform address of an aggregated request platform.

7. The gateway of claim 6, wherein the plurality of requests are aggregated based on an inference model, and wherein the aggregated request is a single message.

8. The gateway of claim 1, wherein the processing circuitry is to:
   send an indication to the requester of the different request that its request has been delayed.

9. The gateway of claim 1, wherein the processing circuitry is to:
   establish a communication link between the gateway and a second gateway, wherein the gateway receives a platform address of the registered platform from the second gateway.

10. The gateway of claim 1, wherein the latency is based on a physical distance of the registered platform from the gateway or a network speed to the registered platform.

11. A method comprising:
    receiving, at a network gateway, a request from a requester via a network interface of the network gateway, the request including: an inference model identifier that identifies a registered platform of the request and a response time;
    transmit the request to the registered platform to handle the request consistent with the response time, the registered platform selected based on a latency of the registered platform and the response time; and
    drop a different request having a higher response time than the received request.

12. The method of claim 11, wherein when the response time indicates an undefined time, and the method comprises determining the response time based on the inference model identifier.

13. The method of claim 11, comprising storing management and registration interfaces including a platform address of each of a plurality of platforms that are used in the selection of the registered platform.

14. The method of claim 11, comprising:
assessing a plurality of platforms capable of handling the request within a time indicated by the response time; and
determining a platform address of the registered platform based on at least one of: an availability of the plurality of platforms or previous routings of requests.

15. The method of claim 11, comprising:
aggregating a plurality of requests into an aggregated request; and
routing the aggregated request to a platform address of an aggregated request platform.

16. The method of claim 11, comprising:
associating the network gateway with the requester; and
establishing a communication link between the network gateway and the requester when the requester meets a predefined linking criteria.

17. The method of claim 11, comprising sending an indication to the requester of the different request that its request has been dropped.

18. The method of claim 11, comprising establishing a communication link between the network gateway and a second network gateway, wherein the network gateway receives a platform address of the registered platform from the second network gateway.

19. The method of claim 11, wherein the latency is based on a physical distance of the registered platform from the network gateway.

20. The method of claim 11, wherein the latency is based on network speed to the registered platform.

21. At least one non-transitory machine-readable medium including instructions, which when executed by a network gateway, cause the network gateway to:
receive a request from a requester via a network interface of the network gateway, the request including: an inference model identifier that identifies a known platform of the request and a response time value;
transmit the request to the known platform to handle the request consistent with the response time value, the known platform selected based on a latency of the known platform and the response time value; and
delay a different request having a higher response time value than the received request.

22. The at least one non-transitory machine-readable medium of claim 21, wherein when the response time value indicates an undefined time, and including instructions to determine the response time value, based on the inference model identifier.

23. The at least one non-transitory machine-readable medium of claim 21, including instructions to store management and registration interfaces including platform addresses of platforms that are used in the selection of the known platform.

24. The at least one non-transitory machine-readable medium of claim 21, including instructions to:
assess a plurality of platforms capable of handling the request within a time indicated by the response time value; and
determine a platform address of the known platform based on at least one of: an availability of the plurality of platforms or previous routings of requests.

25. The at least one non-transitory machine-readable medium of claim 21, including instructions to:
aggregate a plurality of requests into an aggregated request; and
route the aggregated request to a platform address of an aggregated request platform.

26. The at least one non-transitory machine-readable medium of claim 21, including instructions to:
associate the network gateway with the requester; and
establish a communication link between the network gateway and the requester when the requester meets a predefined linking criteria.

27. The at least one non-transitory machine-readable medium of claim 21, including instructions to send an indication to the requester of the different request that its request has been delayed.

28. The at least one non-transitory machine-readable medium of claim 21, including instructions to establish a communication link between the network gateway and a second network gateway, wherein the network gateway receives a platform address of the known platform from the second network gateway.

29. An Internet of Things (IoT) system comprising:
an IoT device; and
a gateway comprising:
memory; and
processing circuitry coupled to the memory, the processing circuitry to:
receive a request from the IoT device via a network interface of the gateway, the request including: an inference model identifier that identifies a known platform of the request and a response time indicator;
transmit the request to the known platform to handle the request consistent with the response time indicator, the known platform selected based on a latency of the known platform and the response time indicator; and
delay a prior request having a higher response time indicator than the received request.

30. The IoT system of claim 29, wherein the latency is based on network speed to the known platform.

* * * * *